United States Patent
Kraemer et al.

(10) Patent No.: US 9,158,743 B1
(45) Date of Patent: Oct. 13, 2015

(54) GRID LAYOUT CONTROL FOR NETWORK SITE DESIGN

(75) Inventors: Erin H. Kraemer, Seattle, WA (US); Jonathan Kupferman, Diamond Bar, CA (US); Manigandan Natarajan, Redmond, WA (US); Srinivas Guduru, Redmond, WA (US); Katherine L. Corthell, Seattle, WA (US); Julian Sell, Seattle, WA (US); Krista A. Strickland, Seattle, WA (US); Anna Catherine Bell, Seattle, WA (US); Robert K. Maher, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1234 days.

(21) Appl. No.: 13/073,115

(22) Filed: Mar. 28, 2011

(51) Int. Cl.
*G06F 17/00* (2006.01)
*G06F 17/21* (2006.01)
*G06Q 30/06* (2012.01)

(52) U.S. Cl.
CPC .......... *G06F 17/212* (2013.01); *G06Q 30/0641* (2013.01)

(58) Field of Classification Search
CPC .......... G06Q 30/0601; G06Q 30/0641; G06F 17/211–17/212
See application file for complete search history.

(56) References Cited

U.S. PATENT DOCUMENTS

| | | | | |
|---|---|---|---|---|
| 5,903,905 A * | 5/1999 | Andersen et al. | ............ | 715/275 |
| 5,953,733 A * | 9/1999 | Langford-Wilson | ......... | 715/210 |
| 6,028,938 A * | 2/2000 | Malkin et al. | ................. | 713/176 |
| 6,144,974 A * | 11/2000 | Gartland | ........................ | 715/205 |
| 6,690,843 B1 * | 2/2004 | Squilla et al. | .................. | 382/306 |
| 7,124,360 B1 * | 10/2006 | Drenttel et al. | ............... | 715/205 |
| 7,533,336 B2 * | 5/2009 | Jaffe et al. | ....................... | 715/243 |
| 8,411,114 B2 * | 4/2013 | Akiya | ........................... | 345/641 |
| 8,510,651 B1 * | 8/2013 | Palkar et al. | ................... | 715/273 |
| 8,676,658 B2 * | 3/2014 | Marcus et al. | ............... | 705/26.1 |
| 8,990,672 B1 * | 3/2015 | Grosz et al. | .................... | 715/202 |
| 2002/0026441 A1 * | 2/2002 | Kutay et al. | ........................ | 707/5 |
| 2007/0078875 A1 * | 4/2007 | Kothari et al. | ................. | 707/101 |
| 2007/0101278 A1 * | 5/2007 | Pickering et al. | ............. | 715/762 |
| 2007/0162845 A1 * | 7/2007 | Cave et al. | ..................... | 715/530 |
| 2008/0065974 A1 * | 3/2008 | Campbell | ...................... | 715/200 |
| 2008/0178166 A1 * | 7/2008 | Hunter et al. | .................. | 717/165 |
| 2008/0189156 A1 * | 8/2008 | Voda et al. | ......................... | 705/7 |
| 2008/0215985 A1 * | 9/2008 | Batchelder et al. | ........... | 715/731 |
| 2008/0313533 A1 * | 12/2008 | Hoyer et al. | .................... | 715/243 |
| 2009/0094508 A1 * | 4/2009 | Kanzaki et al. | ............... | 715/201 |
| 2011/0016419 A1 * | 1/2011 | Grosz et al. | .................... | 715/769 |
| 2011/0131482 A1 * | 6/2011 | Shteinvil et al. | .............. | 715/229 |
| 2011/0157609 A1 * | 6/2011 | Brady et al. | .................... | 358/1.6 |
| 2011/0197126 A1 * | 8/2011 | Arastafar | ....................... | 715/243 |
| 2012/0054617 A1 * | 3/2012 | Bachman et al. | ............. | 715/723 |

(Continued)

*Primary Examiner* — Ryan Pitaro
(74) *Attorney, Agent, or Firm* — Thomas | Horstemeyer, LLP

(57) ABSTRACT

Disclosed are various embodiments for designing a network site. A grid layout component is provided in conjunction with a network page. The network page has at least one text element and at least one image element. The grid layout component has a plurality of cell configurations. Each cell configuration includes at least one text cell and at least one image cell. An indication is received from a user, indicating that one of the cell configurations is to be an initial cell configuration. In response to the user indication, the at least one text element and the at least one image element are displayed in a grid having the initial cell configuration. Layout code is generated which renders the grid, including the at least one text element and the at least one image element, within the network page for display by the browser.

22 Claims, 9 Drawing Sheets

(56) References Cited

U.S. PATENT DOCUMENTS

| | | | |
|---|---|---|---|
| 2013/0091427 A1* | 4/2013 | Anderson et al. | 715/267 |
| 2013/0124981 A1* | 5/2013 | Chao et al. | 715/243 |
| 2013/0179816 A1* | 7/2013 | Seo et al. | 715/770 |
| 2013/0246896 A1* | 9/2013 | Barnes et al. | 715/202 |
| 2014/0096041 A1* | 4/2014 | Gowen et al. | 715/753 |
| 2014/0149846 A1* | 5/2014 | Ansel et al. | 715/234 |
| 2014/0195921 A1* | 7/2014 | Grosz et al. | 715/738 |
| 2014/0245115 A1* | 8/2014 | Zhang et al. | 715/202 |

\* cited by examiner

FIG. 6

GRID LAYOUT CONTROL FOR NETWORK SITE DESIGN

BACKGROUND

A network site including network pages may be hosted by a hosting provider. A site administrator for the network site may design the network pages to include text and images, arranged in various ways on the page. The site administrator may further link the network pages in a hierarchical manner so that a user sees the network pages as a single network site.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIG. 6 is a drawing of another example of a user interface used in the networked environment of FIG. 1 according to various embodiments of the present disclosure.

DETAILED DESCRIPTION

The various embodiments described herein relate systems and methods for designing a network site, such as a web site. Network pages within the web site include image and text elements arranged in a grid having multiple cells. A network site designer uses a network site designer application to insert text and image elements into the cells and to modify the properties of those elements. The network site designer uses a grid layout control within the application to choose a cell configuration. One example of a cell configuration is horizontally oriented, with a row of small cells across the bottom. Another example of a cell configuration is vertically oriented, with a column of small cells on the right. Using the grid layout control, the network site designer can switch from one cell configuration to another without losing either the content or the formatting of the cells. In the following discussion, a general description of the system and its components is provided, followed by a discussion of the operation of the same.

Figure 1:
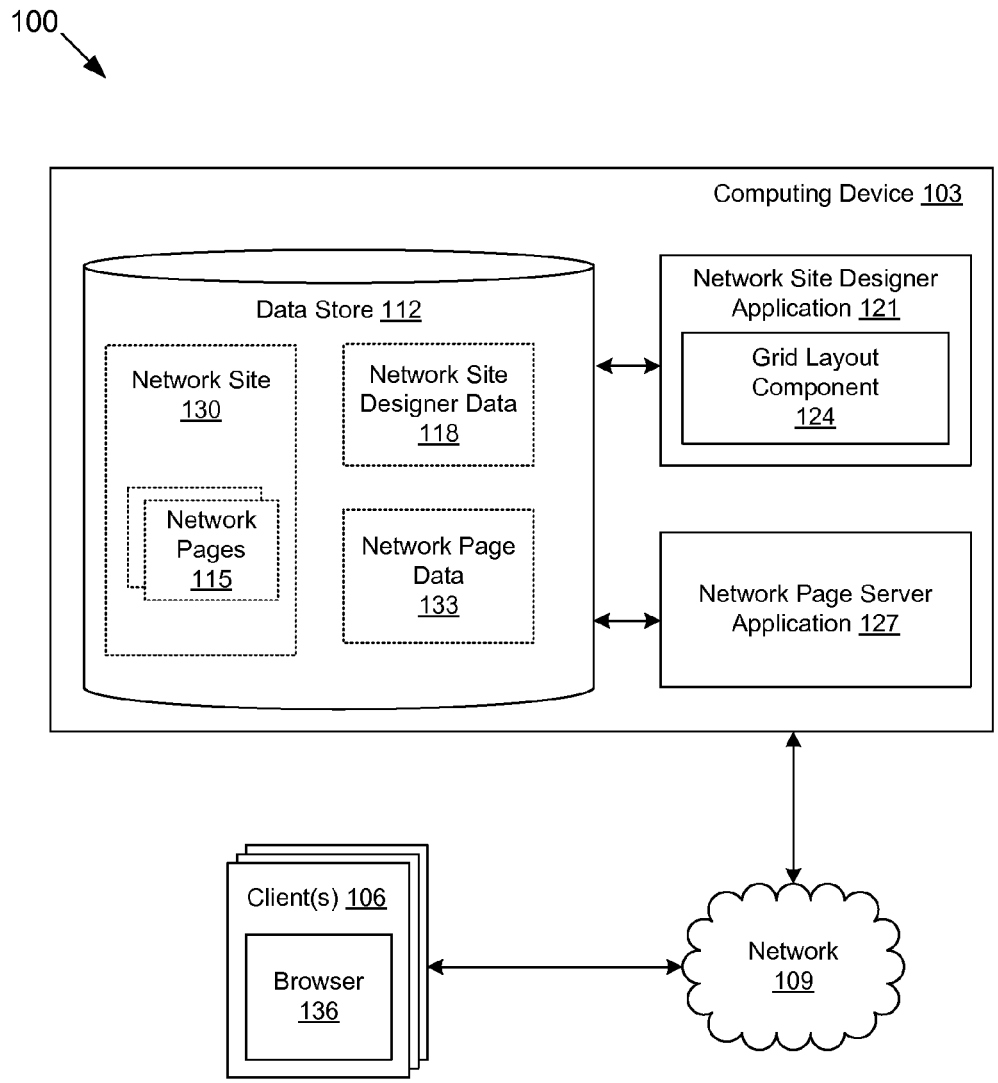
FIG. 1 is a drawing of a networked environment according to one embodiment of the disclosure.

With reference to FIG. 1, shown is a networked environment 100 according to various embodiments. The networked environment 100 includes one or more computing devices 103 in data communication with one or more client devices 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. A plurality of computing devices 103 together may comprise, for example, a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores as can be appreciated. The data stored in the data store 112 includes data accessed by the components executing on the computing device 103, for example, network pages 115 and network site designer data 118, as well as potentially other data.

The components executed on the computing device 103 include, for example, a network site designer application 121, a grid layout component 124, and a network page server application 127. The components executed on the computing device 103 may also include other applications, services, processes, systems, engines, or functionality not discussed in detail herein. These components may communicate with each other using various mechanisms, including but not limited to any type of middleware framework. Examples of such frameworks include remote procedure calls, simple object access protocol (SOAP), representational state transfer (REST), Windows Communication Foundation, and other frameworks. Though shown as logically separate components, the functionality of these components can be combined and/or distributed in various ways, as can be appreciated.

A set of network pages 115 is arranged in a hierarchy to form a network site 130. The computing device 103 acts as a web hosting provider to host network sites 130 for various customers. To this end, the network page server application 127 is executed to receive requests for network pages 115 associated with one of the hosted network sites 130. These network page requests are generated by a client device 106 and received over the network 109. The network page server application 127 is further executed to generate a network page 115 corresponding to the network page request, i.e., a network page 115 associated with one of the hosted network sites 130. The network page server application 127 is further executed to serve up the generated network pages 115 in response to the network page requests.

The network pages fetched by the network page server application 127 may be dynamically generated or may be static. To this end, the network page server application 127 uses network page data 133, which may include any type of data related to the generation of network pages. Such data may include, for example, templates, executable code, interpreted code, hypertext markup language (HTML), extensible markup language (XML), images, video, text, graphics, and any other type of data that may be used in network pages. The network page server application 127 may comprise a hypertext transfer protocol (HTTP) server such as Apache® HTTP Server, Apache® Tomcat®, Microsoft® Internet Information Services (IIS), and/or any other type of network page server application.

The network site designer application 121 is executed to allow a network site administrator or designer to design the network pages 115 that make up the network site 130. The network site designer application 121 makes use of a grid layout component 124 which allows the network site designer to arrange text and image elements on the network page 115.

The client device 106 is representative of a plurality of client devices that may be coupled to the network 109. The client device 106 may comprise, for example, a processor-based system such as a computer system. Such a computer system may be embodied in the form of a desktop computer, a laptop computer, a personal digital assistant, a cellular telephone, a set-top box, a music player, a video player, a media player, a web pad, a tablet computer system, a game console, or other devices with like capability.

The client device 106 may be configured to execute various applications such as a browser 136 and other applications. The browser 136 may be executed in a client device 106, for example, to access and render network pages, such as web pages, or other network content served up by the network site designer application 121. For example, the browser 136 may be used to interact with the network site designer application 121. The client device 106 may be configured to execute applications beyond browser 136 such as, for example, email applications, instant message applications, and/or other applications.

Next, a general description of the operation of the various components of the networked environment 100 is provided. To begin, a user interacts with the network site designer application 121 to create network pages 115 and arrange the pages hierarchically to form a network site 130. A network page 115 can take the form of a cells arranged in a grid, with each cell including a text element or an image element. The user interacts with the grid layout component 124 within the network site designer application 121 to edit the text and image elements within a cell, to rearrange or resize individual cells within the grid, or to make other modifications to the grid. The user can also interact with the grid layout component 124 to select another cell configuration, and the grid layout component 124 then applies the selected cell configuration to the grid. For example, the user can switch from a configuration having one cell on the left and three cells on the right to another configuration having three cells on the left and one cell on the right.

In some embodiments, the network site 130 operates as an electronic commerce marketplace. In such embodiments, the user may specify a store type, and the network site designer application 121 then inserts default content (text and images) into each of the cells.

The grid layout component 124 presents a what-you-see-is-what-you-get (WYSIWYG) interface, so that changes to the layout of a network page 115 appear immediately within a layout view of the network site designer application 121. The network site designer application 121 generates layout code describing the network page 115 as shown by the grid layout component 124. The layout code may include, for example, hypertext markup language (HTML), dynamic HTML, cascading style sheets (CSS), server side scripting, client side scripting, and other forms of layout code. The network site designer application 121 may validate the layout code to insure that it conforms to one or more standards.

FIGS. 2-7 show user interface screens that can be generated by the network site designer application 121 (FIG. 1) using the grid layout component 124 (FIG. 1). The depicted user interface screens 200 can be rendered by a browser 136 (FIG. 1) executing in a client device 106 (FIG. 1) in the networked environment 100 (FIG. 1) according to various embodiments of the present disclosure.

Figure 2:
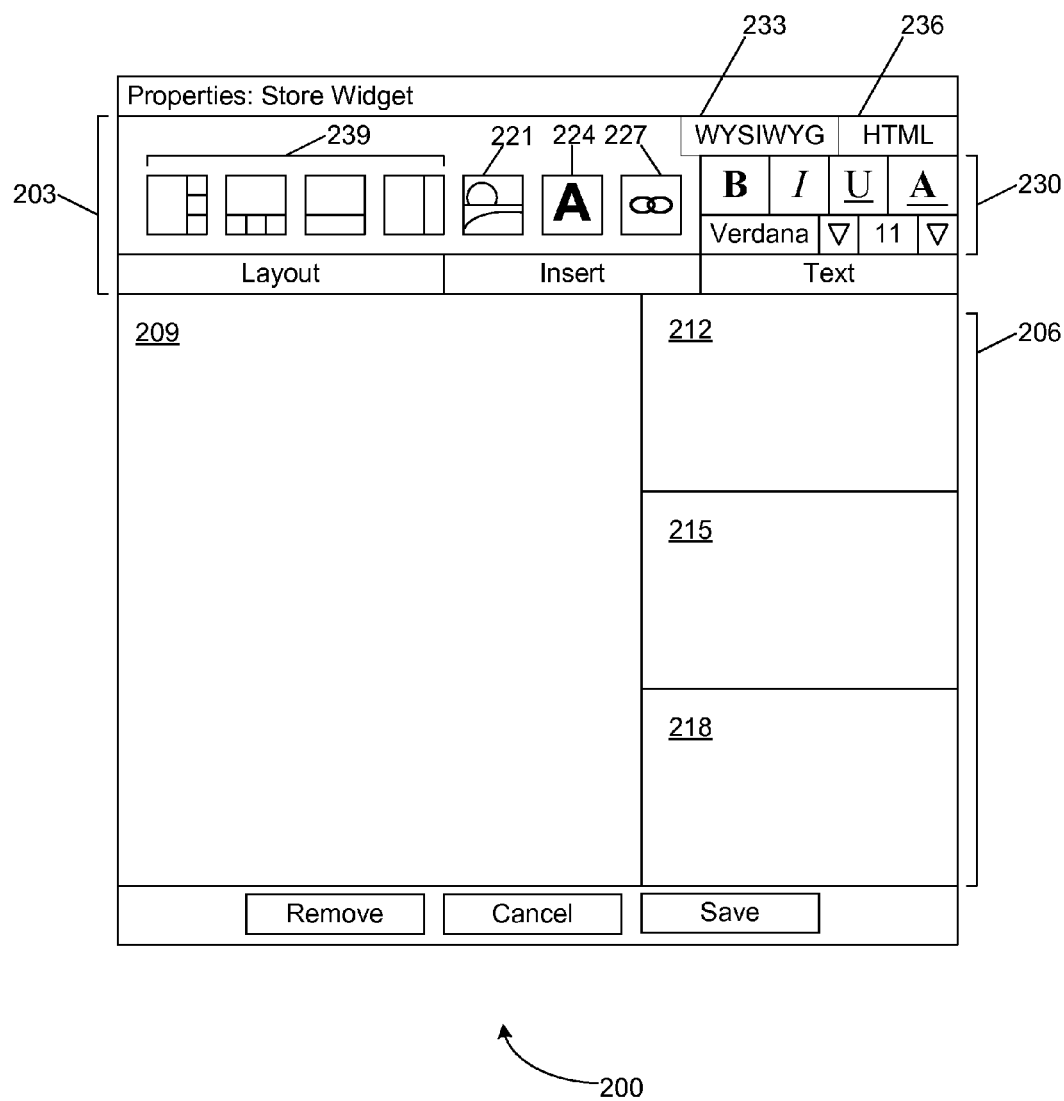
FIG. 2 is a drawing of one example of a user interface used in the networked environment of FIG. 1 according to various embodiments of the present disclosure.

Referring next to FIG. 2, shown is one example of a user interface screen 200 which includes an editing area 203 and a grid 206. The grid 206 shows the current layout of a network page 115 (FIG. 1). In the example shown in FIG. 2, the network page 115 (FIG. 1) is arranged as a grid of four cells: a large cell 209 to the left and three smaller cells 212, 215, 218 arranged in a column on the right. The user interacts with controls in the editing area 203 to make changes to individual cells or to the arrangement of the grid 206. For example, the user can insert an image into a cell or edit properties of an existing image with tool 221, Similarly, the user can insert text into a cell or edit properties of an existing image with tool 224. Similarly, the user can insert a hyperlink into a cell or edit the hyperlink with tool 227. The characteristics of text can be modified with a set of text editing tools 230.

As noted above, the network site designer application 121 (FIG. 1) generates code which captures the layout of the network page 115 as modified by the grid layout component 124 (FIG. 1). The user can switch between viewing this code and viewing the layout by selecting links 233 and 236, respectively.

The grid configuration tool 239 allows the user to create a grid 206 with an initial cell configuration and to change the grid 206 from one cell configuration to another. This example supports four cell configurations: large cell on left and column of three small cells on right; large cell on top and row of three small cells on bottom; large cell on top and small cell on bottom; and large cell on left and small cell on right. However, in other embodiments, the grid configuration tool 239 supports different and/or additional cell configurations.

Figure 3:
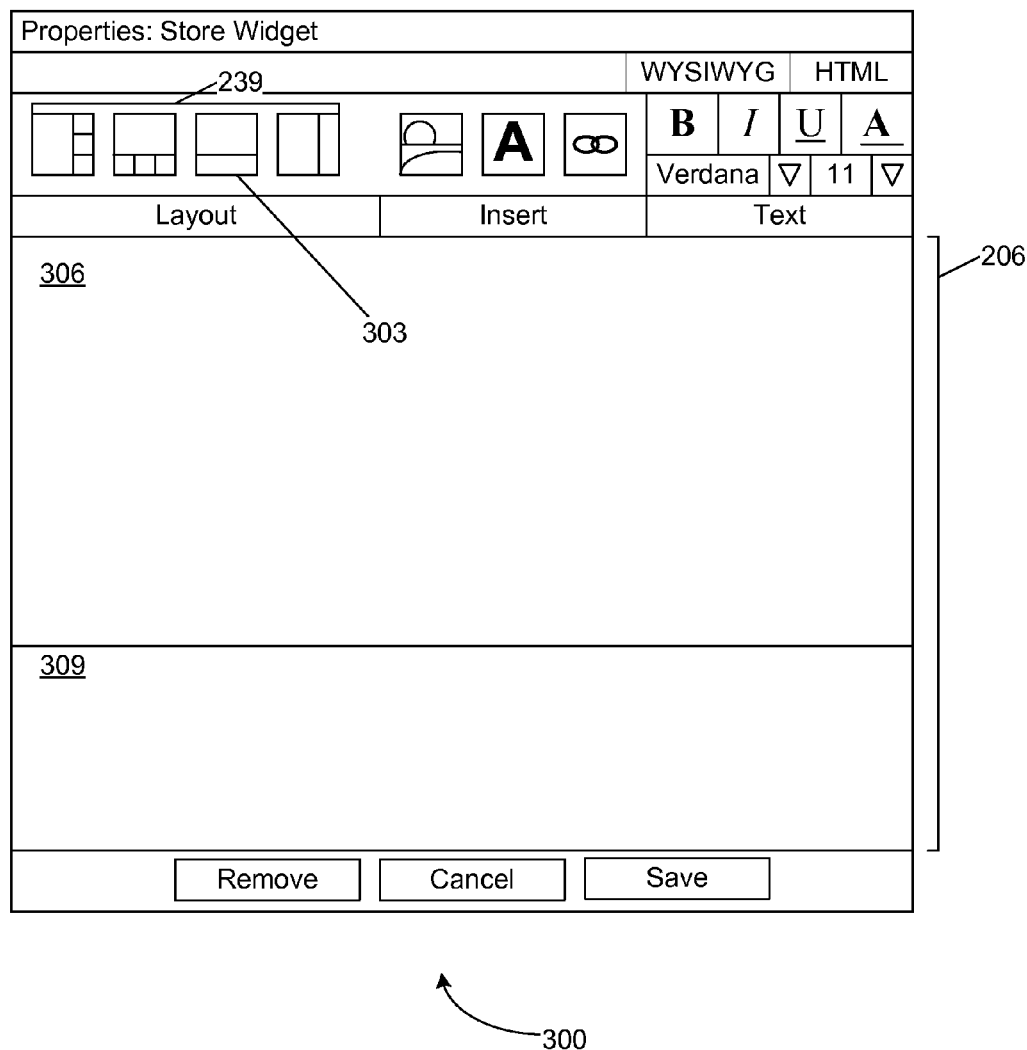
FIG. 3 is a drawing of another example of a user interface used in the networked environment of FIG. 1 according to various embodiments of the present disclosure.

Moving on to FIG. 3, shown is one example of a user interface screen 300 that is produced when the user interacts with the grid configuration tool 239 to select a different cell configuration. Specifically, the user has selected cell configuration 303. This change is reflected in the grid 206, which now includes only two cells: a large cell 306 on the top and a smaller cell 309 on the bottom. The content (i.e., images, text, etc.) is carried over from one cell configuration to the next.

Figure 4:
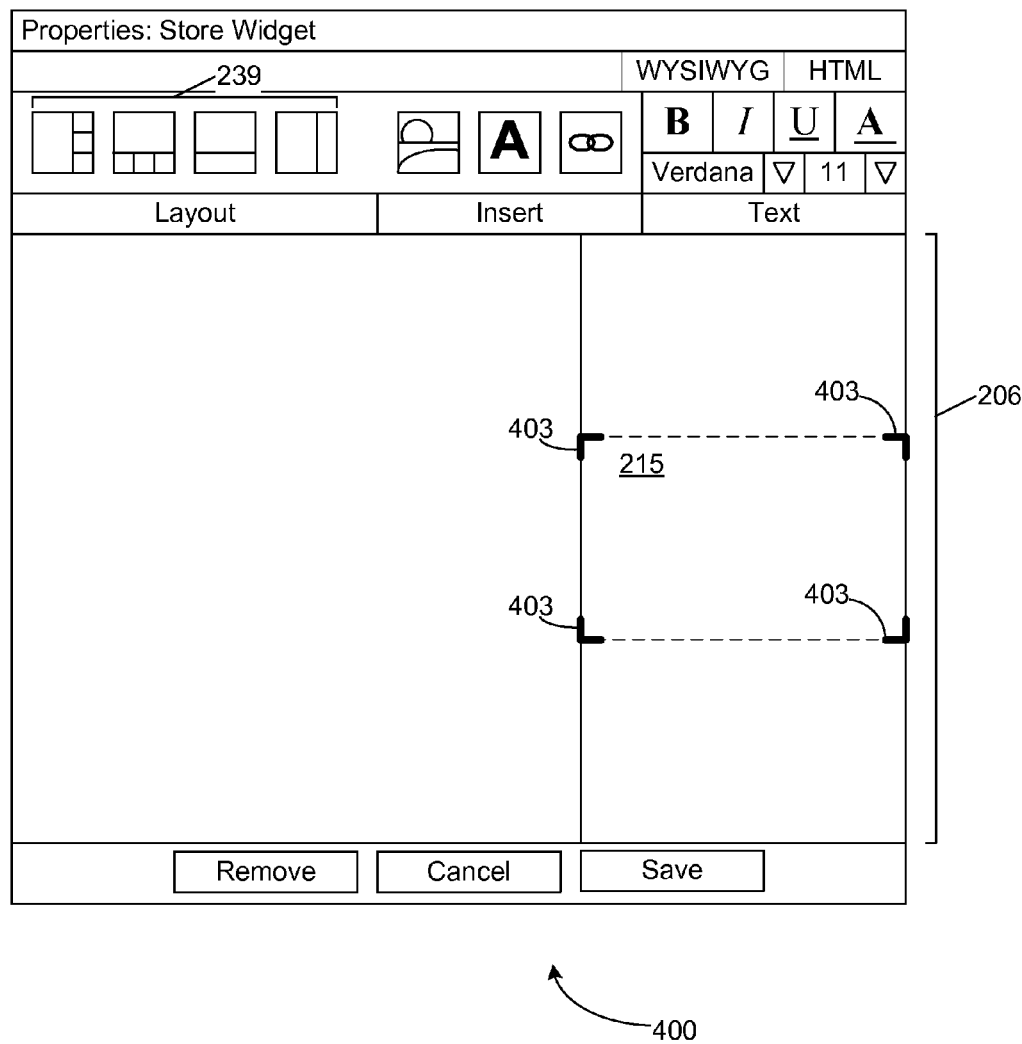
FIG. 4 is a drawing of yet another example of a user interface used in the networked environment of FIG. 1 according to various embodiments of the present disclosure.

With reference now to FIG. 4, shown is one example of a user interface screen 400 that that is produced when the user interacts with the grid configuration tool 239 to move or resize a cell within the grid 206. In this example, the user has selected the right middle cell 215 to be resized. In response, the grid configuration tool 239 has changed the appearance of the right middle cell 215 so that sizing handles 403 appear at the edges of the cell. The user can then drag the sizing handles 403 to resize the cell 215. Then user can select other cells and resize in the same manner. Another mode allows the user to select a cell to be moved within the grid 206 rather than resized. Moving may be accomplished, for example, using a move cursor which appears when the user clicks in a cell area rather than on the resizing handles.

Figure 5:
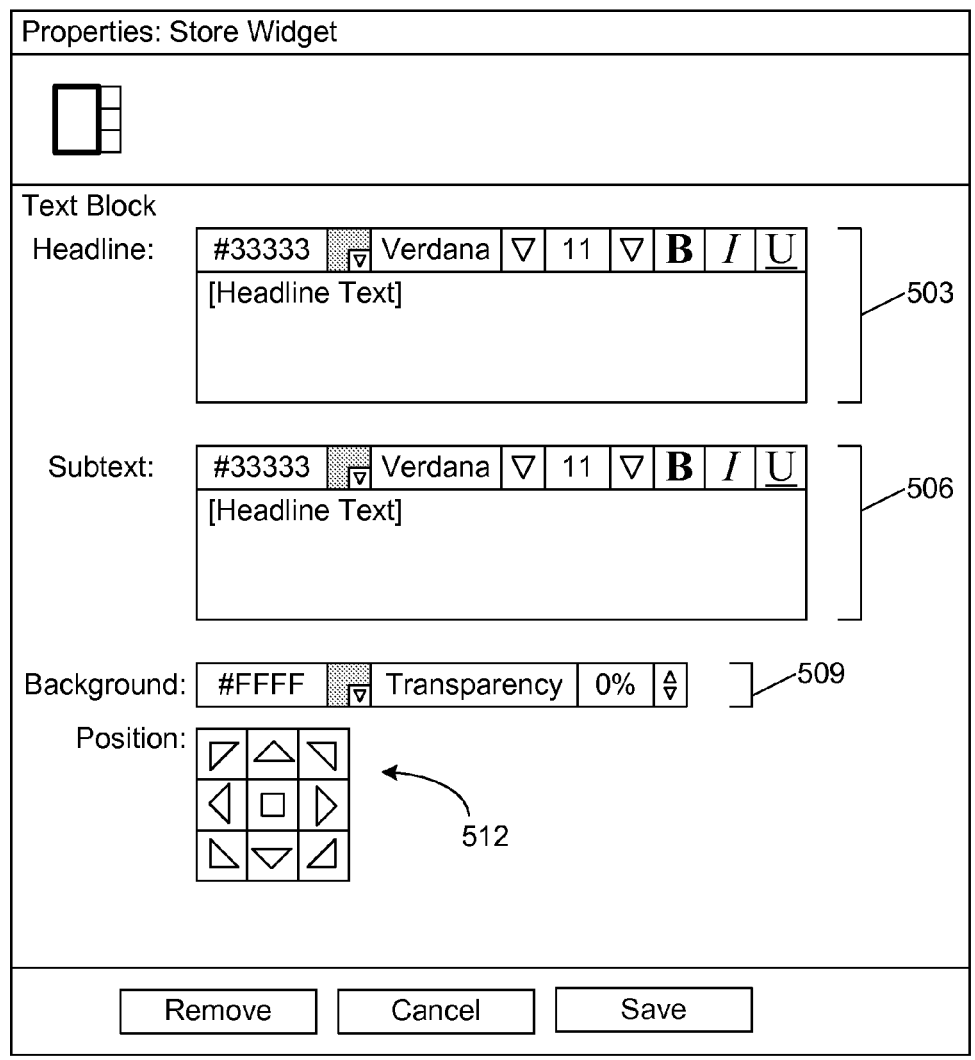
FIG. 5 is a drawing of still another example of a user interface used in the networked environment of FIG. 1 according to various embodiments of the present disclosure.

Turning now to FIG. 5, shown is one example of a user interface screen 500 used for editing properties of a text element. In some embodiments, the user interface screen 500 is a dialog invoked by a mouse click when a particular text cell is selected. The user interface screen 500 includes a headline area 503, a subtext area 506, a background area 509, and a position control 512. The headline area 503 allows the user to change the headline text for the current cell as well the font characteristics of this headline text. The subtext area 506 allows the user to change the subtext for the current cell as well the font characteristics of this subtext. The background area 509 allows the user to change the color and transparency of the background of the current cell. The position control 512 allows the user to change the position of the text cell itself, relative to other cells.

The screen 500 thus provides a single dialog in which a user can edit editing text properties for a cell. However, the screen 500 represents merely one way that the grid layout component 124 supports editing text properties for a cell. In other embodiments, the user edits text properties in a more direct and visual manner. For example, the user may interact with a particular cell of the grid 203 (FIG. 1). to directly enter text content such as headline text and/or subtext. Once text is entered, the user may change the properties of a particular text element through the text cell control 224 and the text properties controls 230 in the editing area 203 (FIG. 1). For example, properties of a text cell such as margins, padding, border and background color can be changed through the text cell control 224. In yet other embodiments, the screen 500 allows a subset of the text properties to be edited through a dialog similar to the one shown in FIG. 5, as well as visual editing directly within the cell.

Figure 6:
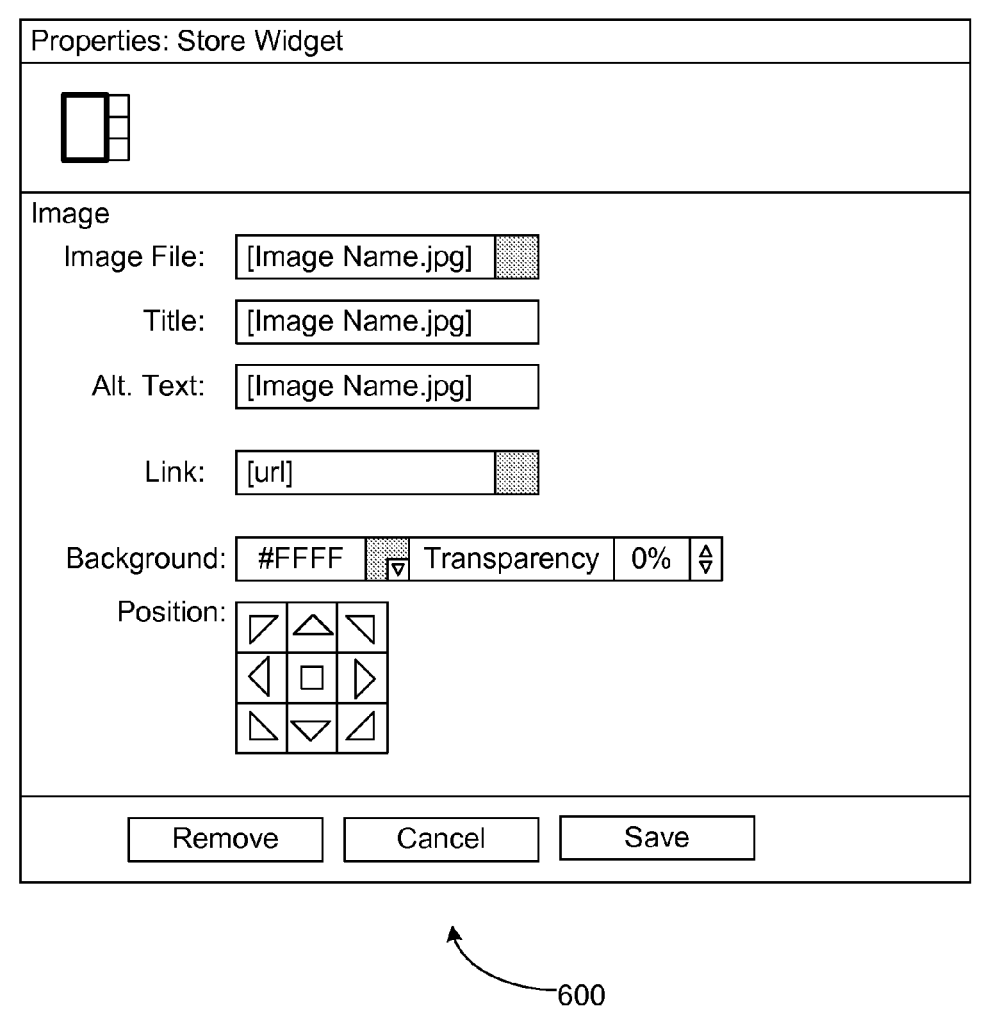

Moving on to FIG. 6, shown is one example of a user interface screen 600 that is produced when the user invokes image properties of the currently selected image cell. In some embodiments, a menu produced by a mouse click is used to invoke this image properties dialog. The user interface screen 600 allows the user to specify: the URL for the image; the title for the image cell; the alternate text for the image cell; the size of the image; a border for the image; and horizontal and vertical spacing for the image. In another embodiment, image properties are edited in a more direct and visual manner. For example, the user may interact with a particular cell of the grid 203 (FIG. 1). to directly add image content to a cell. Once an image is entered, the user may change the properties of a particular image element through the text controls in the editing area 203 (FIG. 1).

Figure 7:
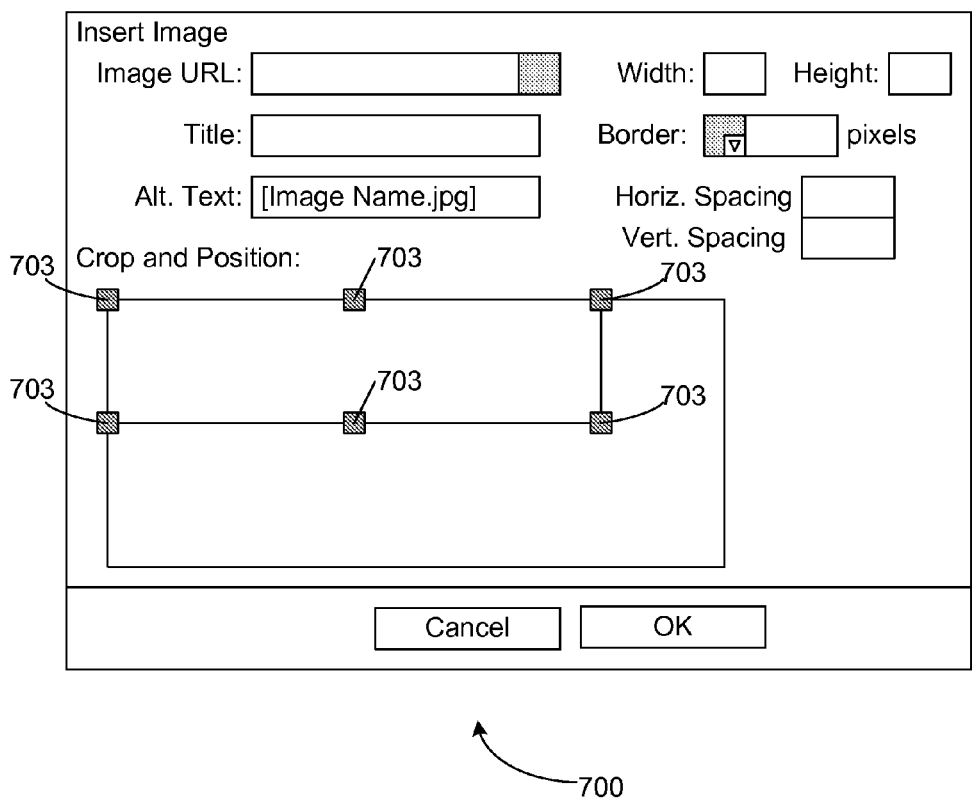
FIG. 7 is a drawing of yet another example of a user interface used in the networked environment of FIG. 1 according to various embodiments of the present disclosure.

Turning now to FIG. 7, shown is one example of a user interface screen 700 that is produced when the user invokes image properties of the currently selected image cell. In addition to editing properties such as those discussed in conjunction with FIG. 6, this embodiment allows a user to change the size of the image to fit the cell, by dragging handles 703. In some embodiments, the grid layout component 124 (FIG. 1) automatically displays the handles 703 whenever the user selects an image that is too large for the cell, and the crop window defaults to the size that will fit the cell. The user can drag handles 703 to change the size of the image and/or select a different portion of the image. The grid layout component 124 then reduces the size of the selected image to fill the cell, while maintaining the aspect ratio according to the selection. In a similar manner, if the image is too small to fill the entire cell, the grid layout component 124 increases the size of the selected area of the image to fill the entire cell, while maintaining the aspect ratio. Though the screen 700 allows both image resizing and image property editing, in other embodiments the image resizing behavior described above is presented on one screen and image properties are edited through another screen.

Figure 8:
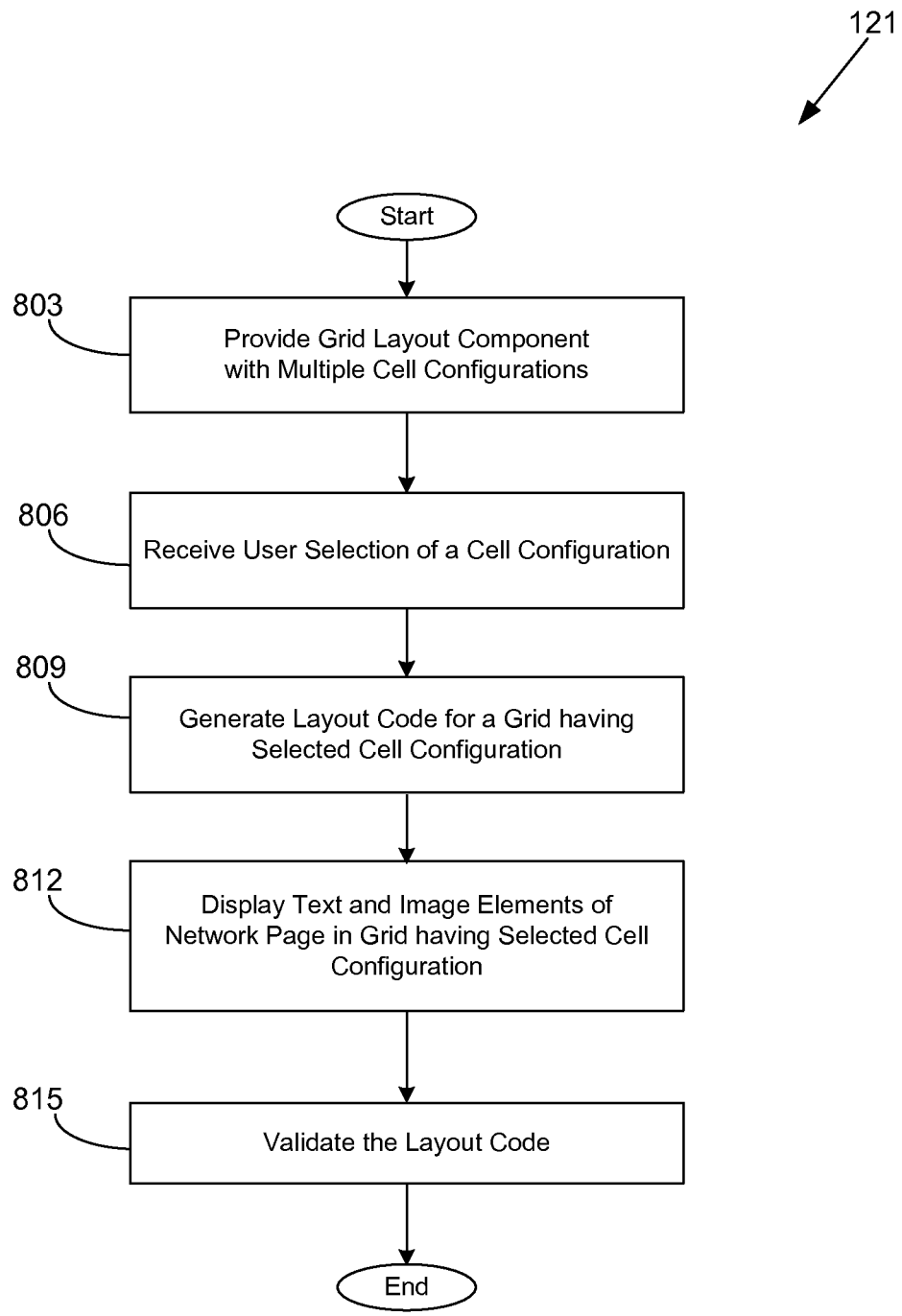
FIG. 8 is a flowchart illustrating an example of functionality implemented as portions of a network site designer application executed in a computing device in the networked environment of FIG. 8 according to various embodiments of the present disclosure.

With reference now to FIG. 8, shown is a flowchart that provides one example of the operation of a portion of the network site designer application 121 according to various embodiments. It is understood that the flowchart of FIG. 8 provides merely an example of the many different types of functional arrangements that may be employed to implement the operation of the portion of the network site designer application 121 as described herein. As an alternative, the flowchart of FIG. 8 may be viewed as depicting an example of steps of a method implemented in the computing device 103 (FIG. 1) according to one or more embodiments.

Beginning at box 803, the network site designer application 121 provides a grid layout component 124 (FIG. 1) to the user. The grid layout component supports multiple cell configurations, where each cell configuration includes text cell(s) and image cell(s). The grid layout component 124 is presented in conjunction with a particular network page 115 (FIG. 1) having at least one text element and at least one image element.

At box 806, the network site designer application 121 receives a user selection of one of the cell configurations for the grid layout component 124. Next, at box 809 the network site designer application 121 the network site designer application 121 generates layout code which renders a grid within the network page for display by the browser. This grid has the selected cell configuration, including one or more text cells with text elements and one or more image cells with image elements, At box 812, network site designer application 121 displays the grid having the selected cell configuration. in a grid area of the network page, thus producing a what-you-see-is-what-you-get (WYSIWYG) view. At box 815, the network site designer application 121 validates the generated layout code. An error indication may be presented to the user if the validation fails. The process of FIG. 8 is then complete.

The process of FIG. 8 relates to switching from one grid cell configuration to another in response to the user selecting a configuration. Thus, the process of FIG. 8 applies a selected cell configuration to a grid which already exists. In another embodiment, the process relates instead to instantiating or creating a grid with an initial configuration in response to a user instruction. The network site designer application 121 may receive an instruction from the user to create the grid with a default cell configuration. The user instruction to create the grid may also include an indication that one of the cell configurations should be used as an initial cell configuration.

Figure 9:
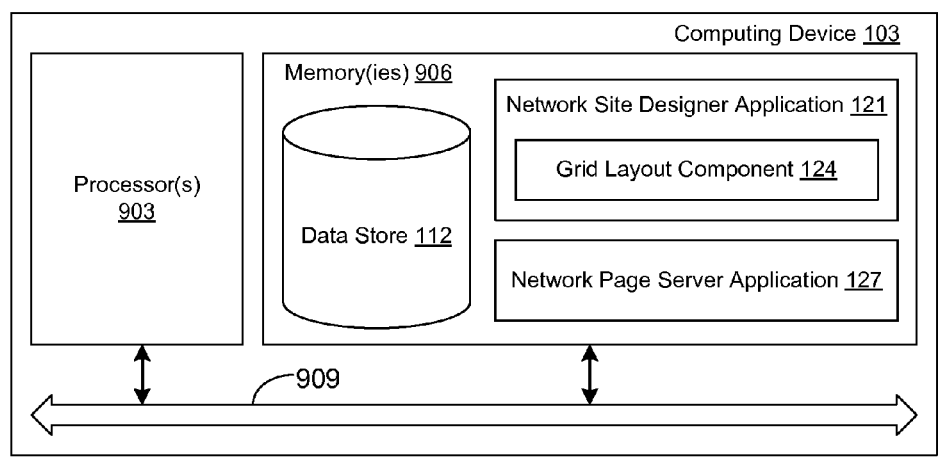
FIG. 9 is a schematic block diagram that provides one example illustration of a computing device employed in the networked environment of FIG. 1 according to various embodiments of the present disclosure.

Moving on to FIG. 9, shown is a schematic block diagram of the computing device 103 according to an embodiment of the present disclosure. The computing device 103 includes at least one processor circuit, for example, having a processor 903 and a memory 906, both of which are coupled to a local interface 909. To this end, the computing device 103 may comprise, for example, at least one server computer or like device. The local interface 909 may comprise, for example, a data bus with an accompanying address/control bus or other bus structure as can be appreciated.

Stored in the memory 906 are both data and several components that are executable by the processor 903. In particular, stored in the memory 906 and executable by the processor 903 are the network site designer application 121, the grid layout component 124, the network page server application 127, and potentially other applications. Also stored in the memory 906 may be a data store 112 and other data. In addition, an operating system may be stored in the memory 906 and executable by the processor 903. While not illustrated, the client device 106 also includes components like those shown in FIG. 9, whereby the browser 136 is stored in a memory and executable by a processor.

It is understood that there may be other applications that are stored in the memory 906 and are executable by the processor 903 as can be appreciated. Where any component discussed herein is implemented in the form of software, any one of a number of programming languages may be employed such as, for example, C, C++, C#, Objective C, Java, JavaScript, Perl, PHP, Visual Basic, Python, Ruby, Delphi, Flash, or other programming languages.

A number of software components are stored in the memory 906 and are executable by the processor 903. In this respect, the term "executable" means a program file that is in a form that can ultimately be run by the processor 903. Examples of executable programs may be, for example, a compiled program that can be translated into machine code in a format that can be loaded into a random access portion of the memory 906 and run by the processor 903, source code that may be expressed in proper format such as object code that is capable of being loaded into a random access portion of the memory 906 and executed by the processor 903, or source code that may be interpreted by another executable program to generate instructions in a random access portion of the memory 906 to be executed by the processor 903, etc. An executable program may be stored in any portion or component of the memory 906 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 906 is defined herein as including both volatile and nonvolatile memory and data storage components. Volatile components are those that do not retain data values upon loss of power. Nonvolatile components are those that retain data upon a loss of power. Thus, the memory 906 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 903 may represent multiple processors and the memory 906 may represent multiple memories that operate in parallel processing circuits, respectively. In such a case, the local interface 909 may be an appropriate network 109 (FIG. 1) that facilitates communication between any two of the multiple processors 903, between any processor 903 and any of the memories 906, or between any two of the memories 906, etc. The local interface 909 may comprise additional systems designed to coordinate this communication, including, for example, performing load balancing. The processor 903 may be of electrical or of some other available construction.

Although the network site designer application 121 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 8 shows the functionality and operation of an implementation of portions of the network site designer application 121. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 903 in a computer system or other system. The machine code may be converted from the source code, etc. If embodied in hardware, each block may represent a circuit or a number of interconnected circuits to implement the specified logical function(s).

Although the flowchart of FIG. 8 shows a specific order of execution, it is understood that the order of execution may differ from that which is depicted. For example, the order of execution of two or more blocks may be scrambled relative to the order shown. Also, two or more blocks shown in succession in flowchart of FIG. 8 may be executed concurrently or with partial concurrence. Further, in some embodiments, one or more of the blocks shown in FIG. 8 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the network site designer application 121, that comprises software or code can be embodied in any non-transitory computer-readable medium for use by or in connection with an instruction execution system such as, for example, a processor 903 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising:
   code that provides, in conjunction with a network page within an electronic marketplace network site, a grid layout component having a plurality of cell configurations, individual ones of the cell configurations including at least one text cell and at least one image cell;
   code that inserts default content into the at least one text cell and the at least one image cell, wherein the default content is based at least in part on a store type;
   code that receives a user selection of one of the cell configurations;
   code that displays, in a grid having the selected cell configuration, a text element in the at least one text cell and an image element in the at least one image cell;
   code that generates layout code which renders the grid within the network page for display by a browser; and
   code that validates the layout code by determining that the layout code conforms to one or more standards.

2. The non-transitory computer readable medium of claim 1, wherein the program further comprises:
   code that changes an appearance of a cell within the grid to include handles, in response to a resize indication; and
   code that resizes the cell in accordance with movement of the handles.

3. The non-transitory computer readable medium of claim 1, wherein the program further comprises:
   code that receives an indication of an image to be inserted into the at least one image cell;
   code that determines whether the image is too large for the at least one image cell; and
   code that displays the image with cropping handles when the image is too large for the at least one image cell, the cropping handles being positioned to show a portion of the image which fits into the at least one image cell.

4. A method, comprising:
   providing, in conjunction with a network page having at least one text element and at least one image element, a grid layout component having a plurality of cell configurations, individual ones of the cell configurations including at least one text cell and at least one image cell;
   receiving a user indication for one of the cell configurations to be an initial cell configuration;
   in response to the user indication, displaying the at least one text element and the at least one image element in a grid having the initial cell configuration;
   generating layout code which renders the grid with the initial cell configuration, including the at least one text element and the at least one image element within the network page for display by a browser; and
   validating the layout code by determining that the layout code conforms to one or more standards.

5. The method of claim 4, further comprising:
   receiving a user selection of a different one of the cell configurations; and
   applying the selected cell configuration to the grid in response to the user selection.

6. The method of claim 4, further comprising inserting default content into a plurality of cells making up the grid, wherein the default content is based at least in part on a store type chosen by the user.

7. The method of claim 4, further comprising modifying the at least one text element to include user-specified content.

8. The method of claim 4, further comprising modifying a property of the at least one text element in accordance with a user instruction.

9. The method of claim 8, wherein the property is selected from the group consisting of font family and font size.

10. The method of claim 4, further comprising modifying a property of the at least one image element in accordance with a user instruction.

11. The method of claim 4, further comprising resizing a cell within the grid in accordance with a user instruction.

12. The method of claim 4, further comprising:
   changing an appearance of a cell within the grid to include handles, in response to a resize indication; and
   resizing the cell in accordance with movement of the handles.

13. The method of claim 4, further comprising inserting an image into the image cell.

14. The method of claim 4, further comprising:
   receiving an indication of an image to be inserted into the at least one image cell; and
   if the image is too large for the at least one image cell, displaying the image with cropping handles that are positioned to show a portion of the image which fits into the at least one image cell.

15. The method of claim 4, further comprising of cropping the image in response to a user instruction.

16. A system, comprising:
   at least one computing device; and
   a network site designer application implemented in the at least one computing device, the network site designer application comprising:
      logic that provides, in conjunction with a network page having at least one text element and at least one image element, a grid layout component having a plurality of cell configurations;
      logic that displays a grid having one of the cell configurations, the at least one text element being displayed in a text cell and the at least one image element being displayed in an image cell;
      logic that obtains a user selection of a different one of the cell configurations as a selected cell configuration;
      logic that applies the selected cell configuration to the grid, responsive to a user selection of a different one of the cell configurations;
      logic that generates layout code which renders the grid having the selected cell configuration within the network page for display by a browser; and
      logic that validates the layout code by determining that the layout code conforms to one or more standards.

17. The system of claim 16, the network site designer application further comprising logic that inserts default content into a plurality of cells making up the grid, wherein the default content is based at least in part on a store type chosen by the user.

18. The system of claim 16, the network site designer application further comprising logic that modifies a property of the at least one text element in accordance with a user instruction.

19. The system of claim 16, the network site designer application further comprising logic that modifies a property of the at least one image element in accordance with a user instruction.

20. The system of claim 16, the network site designer application further comprising logic that moves a cell within the grid in accordance with a user instruction.

21. The system of claim 16, the network site designer application further comprising:
- logic that changes an appearance of a cell within the grid to include a move cursor, in response to a move indication; and
- logic that moves the cell within the grid in accordance with movement of the move cursor.

22. The system of claim 16, further comprising logic that inserts an image into the at least one image element.

* * * * *